United States Patent [19]

Drocco

[11] Patent Number: 5,580,167
[45] Date of Patent: Dec. 3, 1996

[54] KNEADING MACHINE FOR FOOD PRODUCTS HAVING AN ENDLESS CHANNEL WITH KNEADING TOOL AND OBSTRUCTING WALLS MOVABLE THEREIN

[75] Inventor: Amabile Drocco, Alba, Italy

[73] Assignee: Sancassiano Spa, Roddi d'Alba, Italy

[21] Appl. No.: 555,448

[22] Filed: Nov. 9, 1995

[30] Foreign Application Priority Data

Nov. 15, 1994 [IT] Italy .................. T094A0910

[51] Int. Cl.⁶ .................. A21C 1/02; B29B 7/46; B29B 7/82
[52] U.S. Cl. .................. 366/97; 366/149; 366/288; 366/297
[58] Field of Search .................. 366/64–66, 91–98, 366/100, 149, 261, 288, 290, 291, 297, 302, 306; 425/204; 99/348

[56] References Cited

U.S. PATENT DOCUMENTS

| | | | |
|---|---|---|---|
| 4,436,432 | 3/1984 | Drocco | 366/302 X |
| 4,802,407 | 2/1989 | Negri et al. | 366/261 X |
| 5,228,381 | 7/1993 | Virgilio et al. | 366/288 X |
| 5,312,183 | 5/1994 | Drocco | 366/297 X |
| 5,482,366 | 1/1996 | Konig et al. | 366/100 X |

FOREIGN PATENT DOCUMENTS

| | | | |
|---|---|---|---|
| 30393 | 9/1911 | United Kingdom | 366/94 |
| 581414 | 10/1946 | United Kingdom | 366/288 |
| 686771 | 1/1953 | United Kingdom | 366/288 |

*Primary Examiner*—Charles E. Cooley
*Attorney, Agent, or Firm*—Sughrue, Mion, Zinn, Macpeak & Seas

[57] ABSTRACT

In a kneading machine for food products, the product to be kneaded is fed within an endless channel defined within a circular bowl. In the channel there are located helical kneading tools each rotating around a respective axis while all moving simultaneously along the endless channel. Within the channel there project walls, each obstructing the channel immediately behind a respective kneading tool, so that each kneading tool is contained within a kneading chamber separated from the remainder of the channel, this kneading chamber moving along this channel from a loading area for the product to be kneaded to an unloading area for the kneaded product. The machine receives a continuous elongated mass of product to be kneaded and discharges at its outlet a sequence of batches of kneaded product which form again a continuous elongated mass of dough.

9 Claims, 4 Drawing Sheets

KNEADING MACHINE FOR FOOD PRODUCTS HAVING AN ENDLESS CHANNEL WITH KNEADING TOOL AND OBSTRUCTING WALLS MOVABLE THEREIN

BACKGROUND OF THE INVENTION

The present invention relates to the field of kneading machines for food products and particularly (but not exclusively) to machines for preparing flour-based mixtures, of the type comprising:

a kneading bowl, defining a channel having a loading area for the product to be kneaded and an unloading area for the kneaded product, a plurality of kneading tools arranged within said channel and rotatable around axes which are preferably substantially vertical, and means for advancing the product through said channel from said loading area to said unloading area.

Kneading machines of the above indicated type are disclosed for example in European patent EP-B-0 469 500 of the same Applicant, in the corresponding U.S. Pat. No. 5,312,183 and in European patent application EP-A-0 554 513 also of the same Applicant.

According to the most conventional art, the kneading machines for food products include a container in the form of a rotary bowl in which the ingredients of the mixture are placed and which then brings the various portions of the mixture up to the kneading tool during kneading. Machines of this type have kneading tools of various configurations. A particularly advantageous version is a so-called "helical" machine, that is, a machine with a helical kneading tool constituted by a bar with a circular cross-section arranged helicoidally around a theoretic ideal cylinder. These machines produce very good results from the point of view of the quality of the mixture, they perform the kneading cycle fairly quickly, and they can be used to work on different mixtures, their operating characteristics being adapted from time to time to the type of mixture being kneaded.

Machines with rotary bowls have the disadvantage, however, that their operating cycles are discontinuous. In other words, each kneading cycle includes the loading of the bowl with the ingredients of the mixture and finishes with the discharge of the mixture produced from the bowl. Only after the discharge stage is completed can the bowl be refilled with the ingredients necessary to make a fresh mixture. Moreover, for large-scale commercial production, kneading bowls of ever-increasing size tend to be used in order to produce the largest possible batch of mixture in each kneading cycle. At the end of the kneading cycle, the mixture is discharged from the bowl and sent to the user machines, for example, a chopping machine or a moulding machine. In the case of a mixture-containing yeast, the first portion of mixture discharged from the bowl will reach the user machine considerably in advance of the last portion of the mixture, and this results in a different rising time and, eventually, to non-uniform characteristics of the final product.

Naturally, this disadvantage could be avoided by the use of kneading machines which can work continuously. In fact, another conventional technique uses a continuous-flow kneading machine which comprises, essentially, a tubular element containing an Archimedean screw shaft or the like which advances the product along the tubular element and at the same time forms the mixture. However, these known kneading machines of the continuous-flow type cannot produce a mixture of a quality comparable to that which can be produced by a machine with a rotary bowl, particularly a helical machine.

In European patent EP-B-0 469 500, the Applicant has proposed a kneading machine of the type indicated at the beginning of the present description which is able to work continuously and does not have the drawbacks typical of the conventional continuous kneading machines which have been mentioned above. According to this proposal, a kneading machine for food products comprises a container constituted by a straight channel-shaped element along which the mixture being formed is advanced and which has an input end for admitting the product to be kneaded and an output end for discharging the mixture produced. Along the channel-shaped element there are distributed many kneading tools rotatable around vertical axes and preferably of helical shape. The input end of the channel-shaped element is fed alternatively by two mixing units with a sequence of batches of mixed product, so as to form a continuous elongated mass of product which advances along the channel-shaped element meeting thereby in sequence the various kneading tools which provide the kneading thereof. Each of the pre-mixing units arranged upstream of the channel-shaped element is provided for preparing batches of pre-mixed product with precisely weighed quantities of predetermined ingredients. By pre-mixed product, it is meant herein a mixture of the various ingredients having a mass of uniform composition in which however the kneading stage proper, in which formation of gluten takes place, has not yet commenced, this stage being performed in the channel-shaped element. Due to the above mentioned arrangement, the elongated mass of dough coming out of the machine which has been previously proposed by the Applicant has a uniform composition and the adjustment of the machine for production of a dough according to a different recipe is rapid and without difficulty. Therefore, the continuous kneading machine previously proposed by the Applicant does not have the drawbacks typical of the conventional continuous machines. Furthermore, the use of kneading tools of the helical type enables all the advantages typical of the conventional helical kneading machines, with respect to rapidity and quality of the kneading action, to be retained.

Also with reference to the continuous kneading machine previously proposed by the Applicant, in order to control precisely the advancement of the elongated mass of mixture along the channel element, there are provided means to create a cyclic relative movement between the channel element and the group of kneading tools. This cyclic movement includes a first step of horizontal movement (of the channel element with respect to the kneading tools) against the flow of the product, a second descending step, a third step of horizontal movement in the direction of flow of the product and a fourth climbing step. This relative movement may be provided as a movement of the channel element with respect to the kneading tools, or as a movement of the structure carrying all the kneading tools with respect to the channel element. At any rate, the need of providing said relative movement gives raise to a relatively complicated and costly structure, which can be a source of vibrations and problems in operation because of the relatively high weight of the various moving unbalanced masses.

It is also to be noted that the Applicant, in the endeavour to further improve the above described kneading machine, has proposed in its European patent application EP-A-0 554

513 an improved version of this machine which is provided inside of the channel element with a number of counter member walls, rigidly connected to the structure carrying the kneading tools, and each arranged immediately after a respective kneading tool (with reference to the direction of flow of the product), so as to avoid that while a portion of the elongated mass is worked by the kneading tool which has intercepted it, a portion of the dough is thrown by centrifugal force away from the tool, thus escaping to the kneading action.

This improved machine has improved the ability of controlling the kneading process, but has not eliminated the need of using the above described complicated structure in order to provide the relative movement between the channel element and the kneading tools. Also this machine keeps the drawback that during the step of the above described cyclic movement in which the bottom of the channel element is more spaced apart from the kneading tools, the kneading action is interrupted.

SU-A-1.414.659 discloses a machine of the type indicated at the beginning of the present description, belonging to a different field (building mixtures). This machine would be completely unuseful for preparing food admixtures, due to a number of reasons. Firstly, in this known machine the circumferential inner wall of the endless channel rotates relative to the bottom wall of the channel, thus originating the danger of a leakage of product through the gap between said walls. Moreover, which is more important, the channel obstructing walls, in this known machine, are spaced apart from the respective mixing tools and have a planar configuration, which would prevent, in case of processing a food admixture, a product of high quality to be obtained.

SUMMARY OF THE INVENTION

The object of the present invention is that of providing a continuous kneading machine for food products which keeps all the advantages of the continuous kneading machines previously proposed by the Applicant, while eliminating the drawbacks of the Prior Art.

More generally, the invention aims to provide a continuously working kneading machine, which has no dead time for loading and unloading the product, nor during the kneading action, which has a structure relatively simple, low cost and free from vibrations and unbalancements, which assures high characteristics from the point of view of rapidity and quality of the kneading and enables the intensity and speed of the kneading to be controlled as desired.

In view of achieving this object, the invention provides a kneading machine for food products, particularly for flour-based doughs, comprising:

a kneading bowl, defining a channel having a loading area for the product to be kneaded and an unloading area for the kneaded product, a plurality of kneading tools arranged in said channel and rotatable around substantially vertical axes, and means for advancing the product in said channel from said loading area to said unloading area, wherein:
said bowl is a circular bowl and said channel is an endless channel defined within said bowl, having a bottom wall, an outer circumferential wall and an inner circumferential wall,
said kneading tools are distributed along the endless channel and are rotatably supported around their respective axes by a support structure,
said support structure on its turn is rotatably mounted relative to the bowl around the central axis of the bowl, so that the kneading tools, beside rotating around their axes, are all simultaneously moved with respect to said endless channel,
said support structure also carries channel obstructing walls each projecting within said channel behind a respective kneading tool and movable with respect to the channel together with the kneading tools, to define a kneading chamber substantially isolated from the remainder of the channel in association with each kneading tool, such chamber being filled with a batch of product to be kneaded when it passes by the loading area and being emptied from the product kneaded by the respective kneading tool when it passes by the unloading area, after that it has been moved throughout the whole endless channel,
characterized in that:
each kneading tool has a theoretical enveloping cylinder which is substantially tangent to said outer circumferential wall and said inner circumferential wall and has its lower end adjacent to the bottom wall of the bowl,
said obstructing walls of the channel are each made by a substantially curved wall located at the rear of the respective kneading tool (with reference to the direction of movement of the kneading tool along the endless channel) and surrounding at least partially coaxially the rear portion of the theoretical enveloping cylinder of this kneading tool, so as to cooperate with the kneading tool in the kneading action.

It is to be noted that the invention is directed both to the preferred case in which the bowl is fixed and the kneading tools with said obstructing walls are moved along the endless channel of the bowl, and the opposite case, in which the kneading tools and the obstructing walls are fixed and the bowl is rotated.

Preferably, said inner circumferential wall of said endless channel is rigidly connected to said bottom wall and said outer circumferential wall and forms therewith the body of said bowl. Also, in the preferred embodiment the kneading tools are of the helical type.

Due to the above indicated features, the machine according to the invention is able to keep all the advantages characteristic of the continuous kneading machines previously proposed by the Applicant. It is indeed able to work continuously. The loading area of the bowl is fed with a continuous elongated mass of mixed product which fills in sequence the various kneading chambers of the bowl as they come at this loading area. This continuous elongated mass of mixed product is preferably provided by the mixing unit forming the subject of Italian patent application No. TO93A000095 filed on 16 Feb. 1993 by the same Applicant.

At the same time, the machine according to the invention does not have the drawbacks of the continuous kneading machine previously proposed by the Applicant, since it has no unbalanced moving masses. The structure of the machine is greatly simplified and less costly and is not subject to vibrations. Furthermore, during the operation of the machine, there are no dead times during which the dough escapes to the kneading action of the kneading tools. All the advantages typical of the helical kneading machines are also retained by adopting kneading tools having this configuration. Finally, the machine according to the invention may be easily controlled in order to modify the intensity and speed of kneading. It is indeed sufficient to adjust the speed rotation of the kneading tools around their respective axes and/or the speed of rotation of the whole structure carrying the kneading tools around the center of the bowl (which determines a different speed of movement of the kneading tools in the channel). Preferably, to this end, for each kneading tool there is provided a respective driving motor.

The above mentioned obstructing walls of the channel define kneading chambers which are isolated from each other and are occupied each by a respective kneading tool. This enables a high kneading intensity to be obtained, since there is no risk that portions of the dough may escape to the action of the respective kneading tool.

In a preferred embodiment, each kneading tool has a direction of rotation around its axis such that it pushes the product towards the bottom wall of the bowl.

Due to these features, the machine is able to obtain a dough of high quality in a short time, since the product contained in each kneading chamber is worked by the respective kneading tool against the side wall of the bowl, and also against the central column of the bowl, and also against the bottom wall of the bowl, and finally, which is most important, also against the obstructing wall of the channel arranged immediately behind the kneading tool.

In the case of a preferred embodiment, the spacing between the various kneading tools along the channel element is such that each kneading tool has its respective channel obstructing wall arranged immediately behind it, but is also spaced from the channel obstructing wall which is associated with the kneading tool which precedes it in the movement along the channel. Therefore, each kneading chamber defined between two subsequent channel obstructing walls has a free space in front of the respective kneading tool. During operation, the dough rises as a reaction within the helix of the kneading tool until it reaches the top of the latter, whereupon it falls again on the bottom of the wall in said free space where the dough is caught again by the kneading tool, as a result of the movement of the latter along the channel. As already indicated, in fact, the bowl (and hence the bottom of the channel) is fixed, whereas the channel obstructing walls, which define the various kneading chambers, are moved along the channel together with the kneading tools. The above mentioned action in which the dough falls down and is caught again is beneficial for the quality of the dough since the latter is cyclically turned upside-down so as to ensure a greater final homogeneity.

According to a further preferred feature, the side wall and the central column of the bowl, as well as the channel obstructing walls are hollow and there are provided means for circulating a cooling liquid therewithin. Thus, the heat increase due to the kneading action may be limited or nullified, so that the final temperature of the dough is reduced.

It is also to be noted that kneading machines are also known in the art having orbiting kneading tools which have a fixed circular bowl and kneading tools which, beside rotating around their axes, are also caused to orbit around the bowl axis. However, this machines cannot operate continuously. They are non-continuously operating machines absolutely similar to the most conventional machines. In other words, in order to carry out a kneading cycle, it is firstly necessary to fill the bowl, when the machine is inactive, with the ingredients of the dough. When the dough is completed, it is then necessary to stop the machine and to empty the bowl in order to carry out a new kneading cycle. Furthermore, there is no channel defined within the bowl and all the space inside the bowl can be occupied by the product. Each kneading tool processes in sequence the various portions of the dough as it intercepts them. Therefore, it is clearly apparent that these machines do not have the features, nor the advantages of the machine according to the invention.

BRIEF DESCRIPTION OF THE DRAWINGS

Further features and advantages of the invention will become apparent from the description which follows with reference to the annexed drawings, given purely by way of non limiting example, in which.

DETAILED DESCRIPTION OF THE INVENTION

Figure 1:
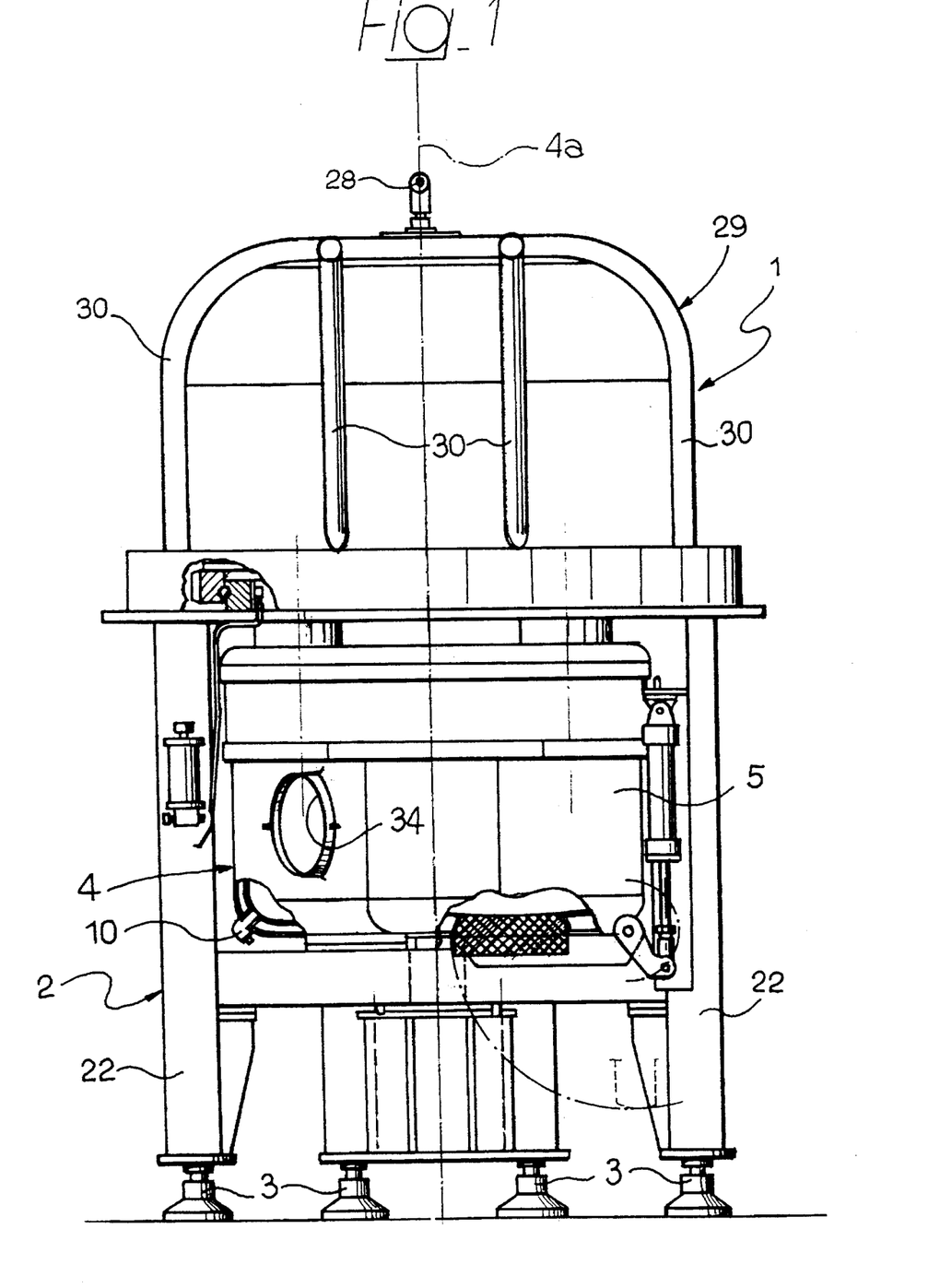
FIG. 1 is an elevational view of a kneading machine according to the invention.
Figure 2:
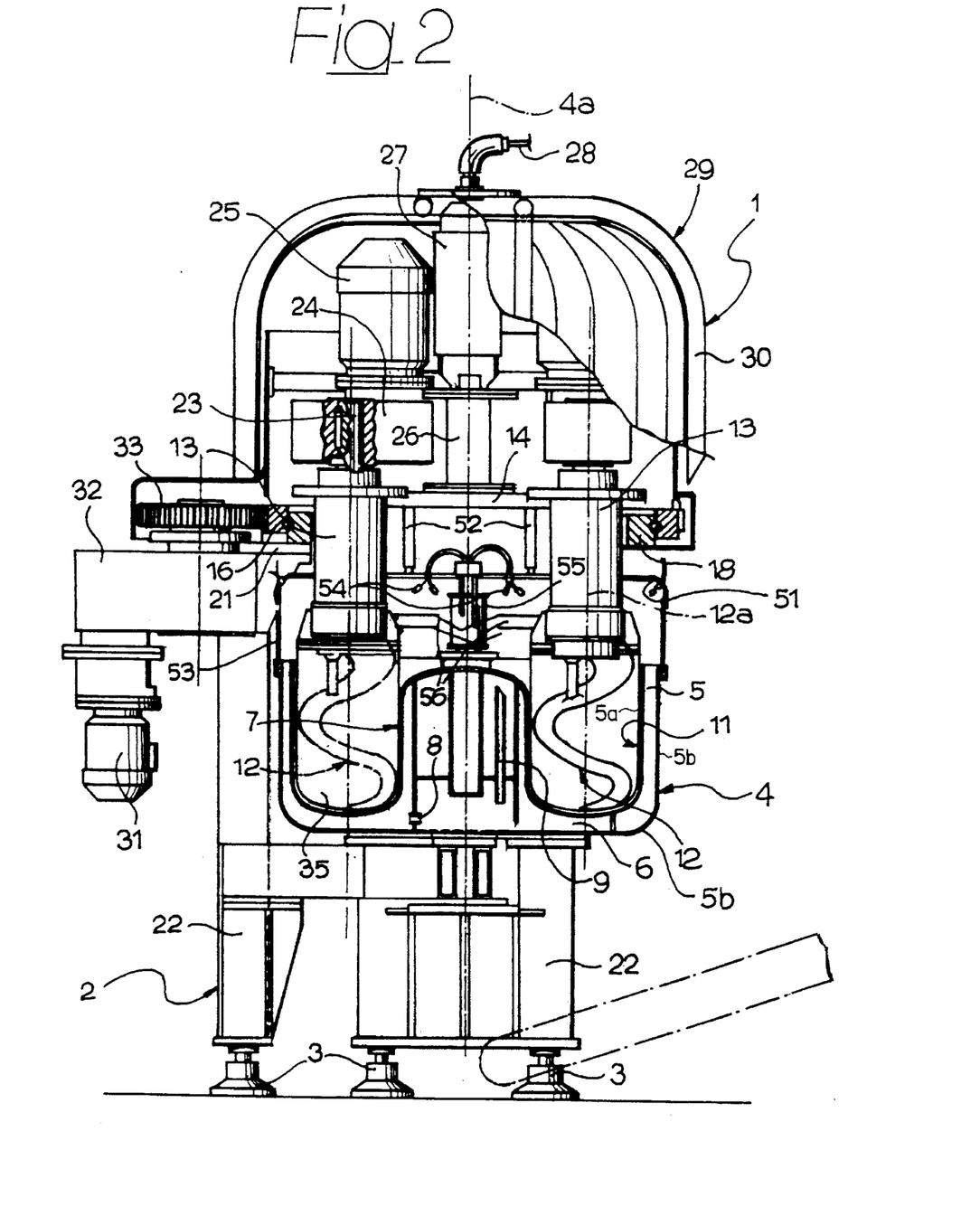
FIG. 2 is a cross-sectional view of the machine of FIG. 1.

With reference to the drawings, numeral 1 generally designates a kneading machine for food products, particularly for flour-based doughs, comprising a fixed supporting structure 2 which rests on the ground by adjustable feet 3. On the support structure 2 there is rigidly connected a circular bowl 4 having a hollow side wall generally designated by 5, a bottom wall generally designated by 6 and a central cylindrical column designated by 7 (FIG. 2). More in detail, side wall 5, bottom wall 6 and the wall of central column 7 of bowl 4 all have an inner space defined by two parallel walls 5a, 5b through which a cooling fluid flows, such as water or water and glycol. The cooling fluid coming from a refrigerating unit (not shown) enters into the inner space through a hole 8 (FIG. 2), fills completely the space and comes out through a tube 9 which is to be connected to the refrigerating unit. This unit provides to recirculate the cooling fluid, so as to keep the walls of bowl 4 very cool, removing heat from the dough which is within the bowl during operation of the machine. For particular applications where it is desired to reduce the temperature of the dough to very low values, there is provided the introduction of cryogenic gas ($CO_2$) directly into the dough through a conduit 10 (FIG. 1) passing through the bottom 6 of bowl 4.

With reference to FIG. 2, side wall 5 and bottom wall 6 of the bowl, together with the wall of central column 7, define an endless channel 11 within which there are distributed many kneading tools 12. The surface of the channel has a substantially U-shaped cross-section, with the bottom branch having reduced ends connected to the two vertical branches. Each kneading tool is of the helical type, i.e. it is constituted by a bar having a helical configuration, with a vertical axis 12a parallel to the central axis 4a of the bowl. In the illustrated example, each kneading tool 12 has a right-hand helix and is to be rotated in a counterclockwise direction, with reference to a plan view, as indicated by arrows X in FIG. 4. Due to this feature, during operation of the machine, each kneading tool 12 tends to compress the mixture against the bottom of the bowl. The theoretical enveloping cylinder of each kneading tool 12 is substantially tangent both to the side wall 5 of the bowl and to the wall of the central column 7. Furthermore, the lower end of each kneading tool 12 is arranged immediately adjacent to the bottom surface of the endless channel 11 and has the same profile (FIG. 2). Due to these features, during operation of the machine, the mixture is compressed both against the bottom wall, and against the side walls of the endless channel 11, to the advantage of rapidity and quality of the kneading action. The various kneading tools 12 are rotatably mounted around their respective axes 12a within vertical cylindrical bodies 13 which are rigidly connected to a circular table 14 rotating around axis 4a. The direction of rotation of the rotary table 14 is that indicated by arrow Y in FIG. 4, i.e. it is opposite to the direction of rotation of the kneading tools 12 around their respective axes. However, it is clearly apparent that, contrary to the illustrated example, the kneading tools might be provided with a left-hand helix and they might rotate in a clockwise direction (with reference to FIG. 4).

Figures 5, 6, 7:
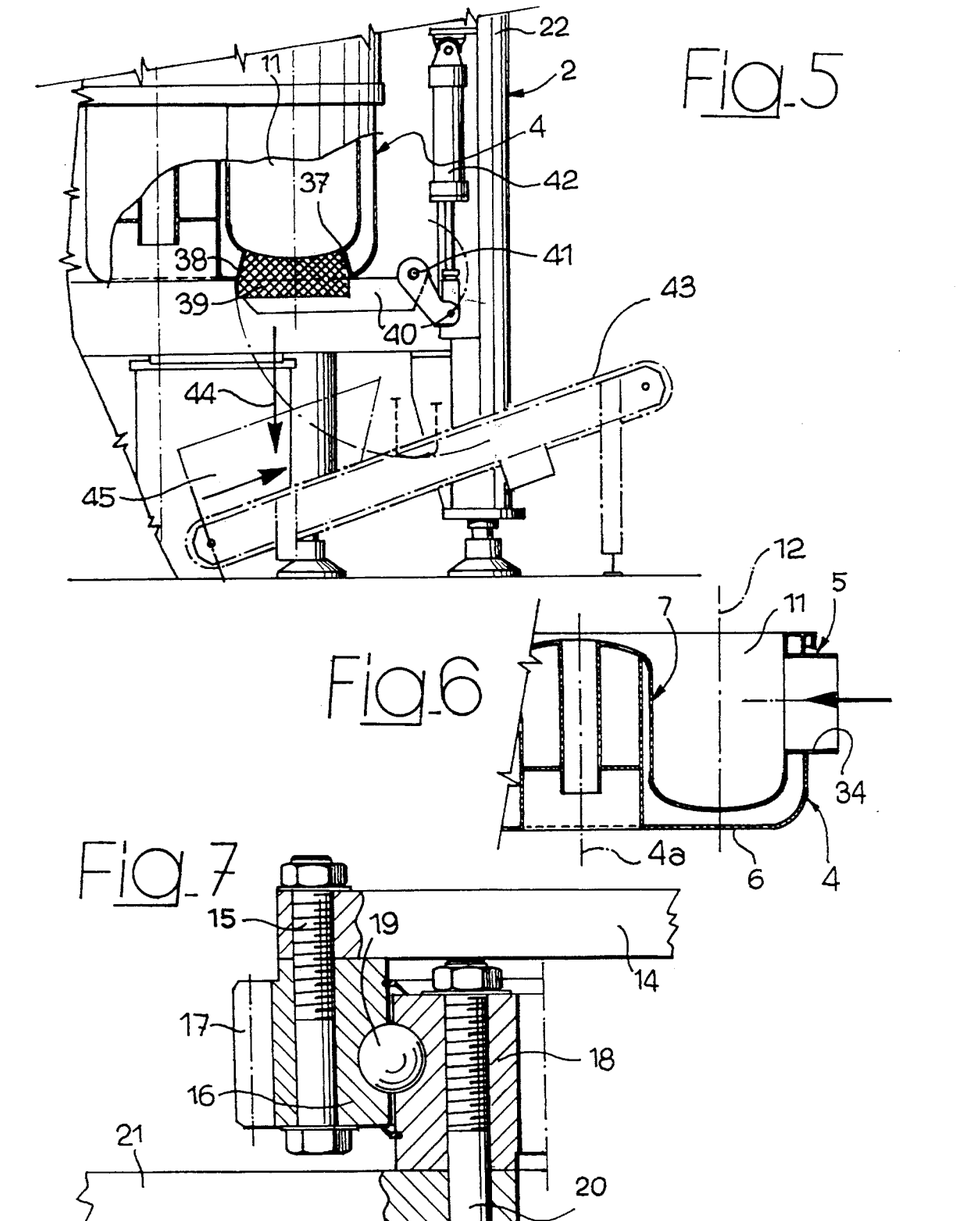
FIGS. 5, 6 are cross-sectional views of some details of FIG. 2.
FIG. 7 is a cross-sectional view at an enlarged scale of a detail of FIG. 2.

With reference to FIGS. 2 and 7, table 14 to which cylinders 13 supporting the kneading tools are anchored, is fixed by bolts 15 arranged along its outer periphery to a ring 16 whose outer surface has teeth 17 (FIG. 7). The ring 16 is freely rotatably supported around axis 4a on an inner ring 18, by interposition of a crown of balls 19. The inner ring 18 is fixed by bolts 20 to brackets 21 (see also FIG. 3) which project in a cantilever fashion from columns 22 (FIGS. 1, 2) forming part of the fixed supporting structure 2 of the machine 1.

Figure 3:
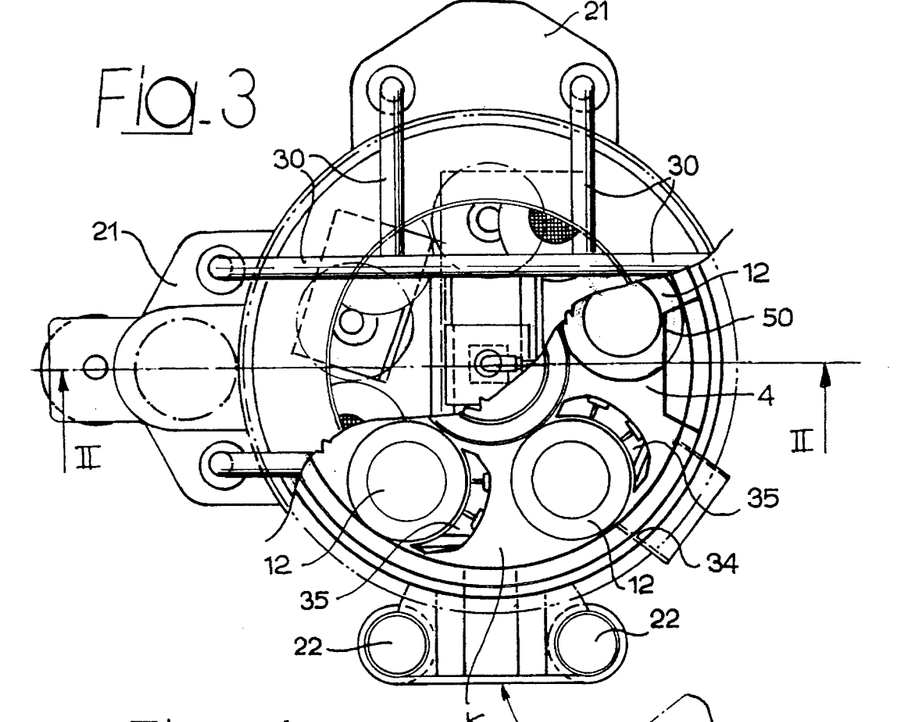
FIG. 3 is a plan view, partially in cross section, of the machine according to the invention, where there is indicated the cross-section line II—II corresponding to the cross-section of FIG. 2.

As already indicated, each kneading tool 12 is rotatably mounted within the respective cylinder 13. To this end, each tool has a shaft 23 which is rotatably supported by radial and axial bearings (not shown) within cylinder 13. The upper end of each shaft 23 is connected by a reducing unit 24 to a respective electric motor 25 (FIG. 2). All electric motors 25 which drive the kneading tools 12 are on their turn supported by the rotary table 14 through a central column 26. The electric supply to electric motors 25 is carried out by a brush collector 27 (of a type known per se) which has at its upper end the stationary inlet of the supply cables 28. The above described unit for driving rotation of the kneading tools 12 is protected by a dome-shaped cover 29 which is supported through arms 30 by the fixed supporting structure of the machine (FIG. 3).

In a preferred embodiment, motors 25 for driving helical kneading tools 12 are made slave to an inverter so that it is possible to vary the speed of the kneading tools according to a predetermined program for obtaining doughs with different characteristics and to vary the intensity of the kneading action.

The rotation of the rotary table 14 is driven by an electric motor 31 which is connected through a reducing unit 32 to a toothed wheel 33 meshing with toothed crown 17 of ring 16. Also motor 31 is made slave to an inverter for varying the speed of rotary table 14. The possibility of varying this speed enables the time in which the dough remains within the bowl to be increased or decreased, as it will become apparent in the following, thus affecting the degree of kneading of the processed product.

Side wall 5 of bowl 4 has an aperture 34 (FIGS. 1, 6) through which a continuous flow of premixed product may be introduced within the endless channel 11. By the expression "premixed product" a product is meant hereby which is obtained by carrying out a first mixing of the ingredients of the mixture. Preferably this operation is carried out by the device forming the subject of Italian patent application TO93A000095 filed on 16 Feb. 1993 by the same Applicant.

Figure 4:
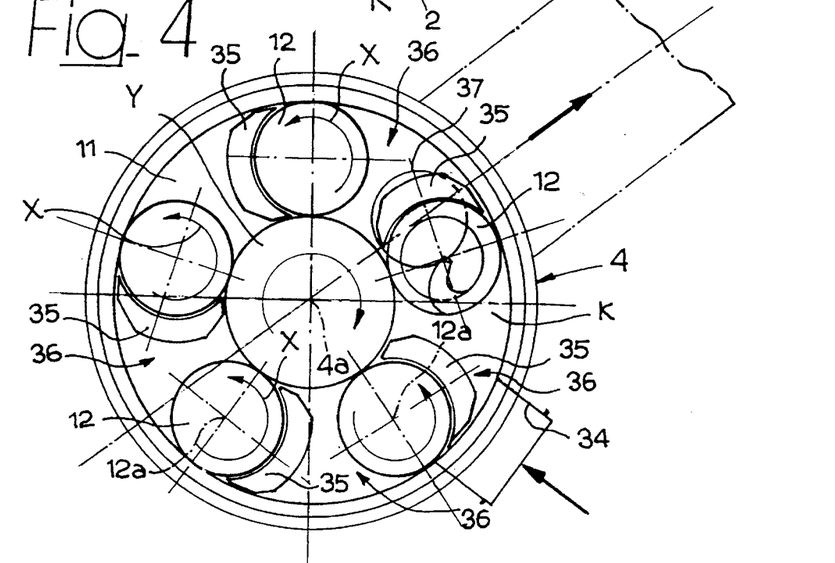
FIG. 4 is a diagrammatic plan view of the machine which shows its principle of operation.

With reference to FIGS. 2–4, to each kneading tool 12 there is associated a wall 35 rigidly connected to the rotary table 14, so that it is fixed with respect to the corresponding kneading tool 12, but movable therewith around the central axis 4a. Each wall 35 is fixed through the respective cylinder 13 to the rotary table 14 and extends downwardly from the lower end of this cylinder so as to obstruct the channel 11. In the preferred embodiment which is shown in the drawings, each wall 35 is located at the rear of the respective kneading tool 12, with reference to the direction of movement of the kneading tools 12 in the endless channel 11. Furthermore, each wall 35 has a curved surface facing the respective kneading tool, which is immediately adjacent and coaxial with the rear portion of the enveloping theoretical cylinder of the kneading tool. Also in the embodiment which has been shown in the drawings, between each wall 35 and the subsequent kneading tool 12 (again with reference to the direction of movement of the tools 12 in channel 11) there is left a free space K, indicated in FIGS. 3, 4. As it clearly appears from these figures, said walls 35 extend throughout the whole radial dimension of channel 11, so that they define within this channel a plurality of kneading chambers 36 isolated from each other, each associated with a kneading tool 12. Since walls 35 are moved together with the kneading tools 12 along the endless channel 11, also said kneading chambers 36 defined by walls 35 are rotated around the central axis 4a of the bowl.

Therefore, in the operation of the machine, when the elongated mass of premixed product is fed inside the bowl through aperture 34, this elongated body fills the kneading chambers 36 in sequence, as they come in front of aperture 34. The portion of premixed product which comes into each kneading chamber is processed by the respective helical kneading tool 12, while it is compelled to move along the endless channel 11 because all the kneading tools 12 and the obstructing walls 35 are simultaneously rotated around central axis 4a. In each kneading chamber 36, the product is worked by the kneading tool 12 against the bottom 6 of bowl 4, against the respective obstructing wall 35, against the central column 7 and against the side wall 5 of the bowl.

Tests conducted by the Applicant have shown that the helical kneading tool 12 has a tendency to hold the dough while exerting a refining action against the above mentioned surfaces. The above described free space K, although not being absolutely necessary, is however preferable since the dough rises cyclically within the kneading tool 12 and escapes by centrifugal force and by gravity from the upper end thereof, falling in the free space K. Immediately after this fall, the dough portion, which is motionless on the fixed bottom of channel 11, is caught again by the helical tool, which is moved in the channel, and processed as described above. There cyclical falls of the dough in the free space K are very useful since the processed dough portion is cyclically turned upside-down, thus ensuring a greater final homogeneity. The dough portion within each kneading chamber 36 is processed while, as indicated already, it is compelled to move along the endless channel 11 (in a clockwise direction with reference to FIG. 4) starting from the loading area 34. Once substantially the whole circumferential extension of channel 11 has been covered, each kneading chamber 36 reaches the discharge aperture 37 formed in the bottom 6 of the bowl. Aperture 37 is a circular aperture and communicates channel 11 to a discharge conduit 38 (FIG. 5) for the kneaded product, which in the preferred embodiment shown in the drawings has a frusto-conical shape in the portion which is located through the inner cavity of bowl 4. Aperture 37 may be obstructed by a cap 39 of synthetic material carried by a lever 40 which is pivotally mounted around an axis 41 on the fixed supporting structure 2 of the bowl and which is movable by a fluid cylinder 42 between a closing position and an opening position of conduit 38. FIG. 5 shows cap 39 in the closing condition. When, starting from this condition, lever 40 is rotated in a counter-clockwise direction around axis 41, conduit 38 is opened and allows the kneaded product to be discharged above a belt conveyor 43 which advances the dough towards the user machines. In FIG. 5, arrows 44, 45 respectively designate the direction of fall of the dough on the belt conveyor 43 and the direction of movement of the upper run of this belt conveyor.

As the kneading chambers 36 pass over aperture 37, they discharge the respective portion of kneaded product over the belt conveyor 43, where these portions form again a continuous elongated mass of dough.

With reference to FIG. 3, bowl 4 has a removable section 50 to enable maintenance operations inside the bowl to be carried out.

The bowl is closed at the top by a rotating cover 51 carried by the rotary table 14 through tie-rods 52 (FIG. 2). The upper edge of the bowl is provided with a safety shield 53 formed by a circular band fixed at its bottom to the upper edge of bowl 4 and provided along its upper edge with an insert of a low friction material, to enable the sliding engagement with the rotating cover 51. On cover 51 there are also arranged nebulizer nozzles 54 which receive a detergent liquid by a manifold 55 and may be supplied according to a programmed automatic cycle in order to carry out an automatic washing of the bowl at the end of a working period or when the recipe of preparation of the dough is modified. Manifold 55 is also used to supply cooling liquid coming through the central column 7 to the inner cavity of the obstructing walls 35, through conduits 56.

As it is apparent from the foregoing description, the machine according to the invention enables operation by supplying a continuous flow of product to be kneaded to the machine itself and gives as its output a continuous elongated mass of kneaded product. It is not necessary to stop the machine for loading and unloading the product, and there are no stages in the operation of the machines in which the product escapes to the engagement by the kneading tools.

The machine according to the invention, therefore, keeps all the advantages of the continuous kneading machine previously proposed by the Applicant, while improving it from the point of view of simplicity of construction and effectiveness of the kneading. The movable equipment of the machine is well balanced and free from vibrations. Finally, all the advantages of the helical-type kneading machines are retained as to the quality of the kneaded product.

As indicated already, the invention covers also the case in which tools 12 and walls 35 remain in a fixed position and bowl 4 is rotated.

Naturally, while the principle of the invention remains the same, the details of construction and the embodiments may widely vary with respect to what has been described and illustrated purely by way of example, without departing from the scope of the present invention.

What is claimed is:

1. Kneading machine for food products, comprising:

a kneading bowl, defining a channel having a loading area for the product to be kneaded and an unloading area for the kneaded product, a plurality of kneading tools arranged in said channel and rotatable around axes which are substantially vertical, and means for advancing the product in said channel from said loading area to said unloading area, wherein:

said bowl is a circular bowl and said channel is an endless channel defined within said bowl, said channel having a bottom wall, an outer circumferential wall and an inner circumferential wall;

said kneading tools are distributed along the endless channel and are rotatably supported around their respective axes by a supporting structure, said supporting structure is rotatably mounted, relative to the bowl, around the central axis of the bowl, so that the kneading tools, beside rotating around their axes, are all moved simultaneously, with respect to said endless channel, said supporting structure also carries channel obstructing walls each projecting within said channel behind a respective kneading tool and movable, with respect to the channel, together with the kneading tools, to define a kneading chamber, associated with each kneading tool, each kneading chamber being substantially isolated from the remainder of the channel, each chamber being filled with a batch of product to be kneaded when each chamber passes by the unloading area, after the product has travelled along the endless channel, and wherein:

each kneading tool has a theoretical enveloping cylinder which is substantially tangent to said outer circumferential wall and said inner circumferential wall and has its lower end adjacent to the bottom wall of the bowl, said obstructing walls are each constituted by a substantially curved wall located at the rear of the respective kneading tool relative to the direction of movement of the kneading tool along the endless channel and surrounding at least partially coaxially the rear portion of the theoretical enveloping cylinder of each respective kneading tool so as to cooperate with the kneading tool in the kneading action.

2. Kneading machine for food products according to claim 1, wherein said inner circumferential wall of said endless channel is rigidly connected to said bottom wall and said outer circumferential wall and forms therewith the body of said bowl.

3. Kneading machine for food products according to claim 1, wherein the kneading tools have a helical configuration.

4. Kneading machine for food products according to claim 3, wherein each kneading tool has a direction of rotation around its axis such that it pushes the product towards the bottom wall of the bowl.

5. Kneading machine for food products according to claim 4, wherein said bowl has an aperture in a side wall thereof for introduction of the product at said loading area, and has an aperture in its bottom wall for discharge of the product at said unloading area.

6. Kneading machine for food products according to claim 1, wherein said circular bowl is fixed and the structure supporting the kneading tools is rotatably mounted thereabove.

7. Kneading machine for food products according to claim 1, wherein the outer circumferential wall and the inner circumferential wall of the channel as well as the channel obstructing walls are hollow and there are provided means for circulating a cooling liquid inside the outer and inner circumferential walls.

8. Kneading machine for food products according to claim 1, wherein with each kneading tool there is associated a respective driving motor.

9. Kneading machine for food products according to claim 1, wherein the spacing between the kneading tools along the channel is such that each kneading tool has a respective channel obstructing wall arranged immediately behind and each kneading tool is spaced from a preceding channel obstructing wall.

* * * * *